United States Patent [19]

Glasenapp et al.

[11] 4,389,029
[45] Jun. 21, 1983

[54] NOSE WHEEL WATER SPRAY DEFLECTOR

[75] Inventors: Rudi K. H. Glasenapp, Bellevue; Andrew J. McCulloch, Renton, both of Wash.

[73] Assignee: The Boeing Company, Seattle, Wash.

[21] Appl. No.: 315,763

[22] Filed: Oct. 28, 1981

Related U.S. Application Data

[63] Continuation of Ser. No. 101,939, Dec. 10, 1979, abandoned.

[51] Int. Cl.³ .............................................. B64C 25/32
[52] U.S. Cl. ............................ 244/103 R; 244/102 R; 244/108; 280/157
[58] Field of Search ........... 244/101 R, 102 R, 103 R, 244/105, 108, 100 R, 130; 280/154.5, 150, 152, 157, 156, 159, 152.05, 160

[56] References Cited

U.S. PATENT DOCUMENTS

| | | | |
|---|---|---|---|
| 2,844,339 | 7/1958 | Stroukoff | 244/101 |
| 2,853,307 | 9/1958 | Dombrowski | 244/108 |
| 3,010,682 | 11/1961 | Moss et al. | 244/108 |
| 3,169,001 | 2/1965 | Horne | 244/103 R |
| 3,184,189 | 5/1965 | Jackson | 244/108 |
| 3,480,237 | 11/1969 | Appleby | 244/130 |
| 3,670,996 | 6/1972 | Jenny | 244/103 R |
| 3,701,500 | 10/1972 | Zeffer et al. | 244/103 R |

Primary Examiner—Galen L. Barefoot
Attorney, Agent, or Firm—Conrad O. Gardner; B. A. Donahue

[57] ABSTRACT

A nose landing gear supported deflector for preventing ingestion of nose wheel side spray into wing mounted engines. The deflector extends horizontally with respect to the runway surface and in front of the nose wheels while permitting landing gear and deflector retraction into the nose gear wheel well through the nose gear doorway.

2 Claims, 5 Drawing Figures

NOSE WHEEL WATER SPRAY DEFLECTOR

This is a continuation, of application Ser. No. 101,939, filed Dec. 10, 1979, now abandoned.

This invention relates to landing gear water spray deflectors and more particularly to a nose wheel water spray deflector.

Heretofore, main landing gear water spray deflectors have included an aft wheel mounted deflector for aircraft having aft body mounted engines and the proposed use of a modified automobile fender type deflector concerned with bow wave spray ingestion by the aircraft engines.

Further exemplary spray deflectors in the patent literature include those shown in U.S. Pat. Nos. 2,814,454; 3,169,001; 3,670,996; and 3,680,885.

In contrast with the preceding, the present deflector embodiment is a landing gear deflection mounted retractable structure which when deployed horizontally in front of the nose wheels prevents wing mounted engine spray ingestion.

It is accordingly an object of the present invention to provide deflector structure for restraining nose landing gear wheel generated side spray from ingestion by wing mounted aircraft engines.

It is yet another object of this invention to provide a nose wheel water spray deflector which is retractable with the nose gear through the wheel well doorway.

A full understanding of the invention, and of its further objects and advantages and the several unique aspects thereof, will be had from the following description when taken in conjunction with the accompanying drawings in which.

Figure 1:
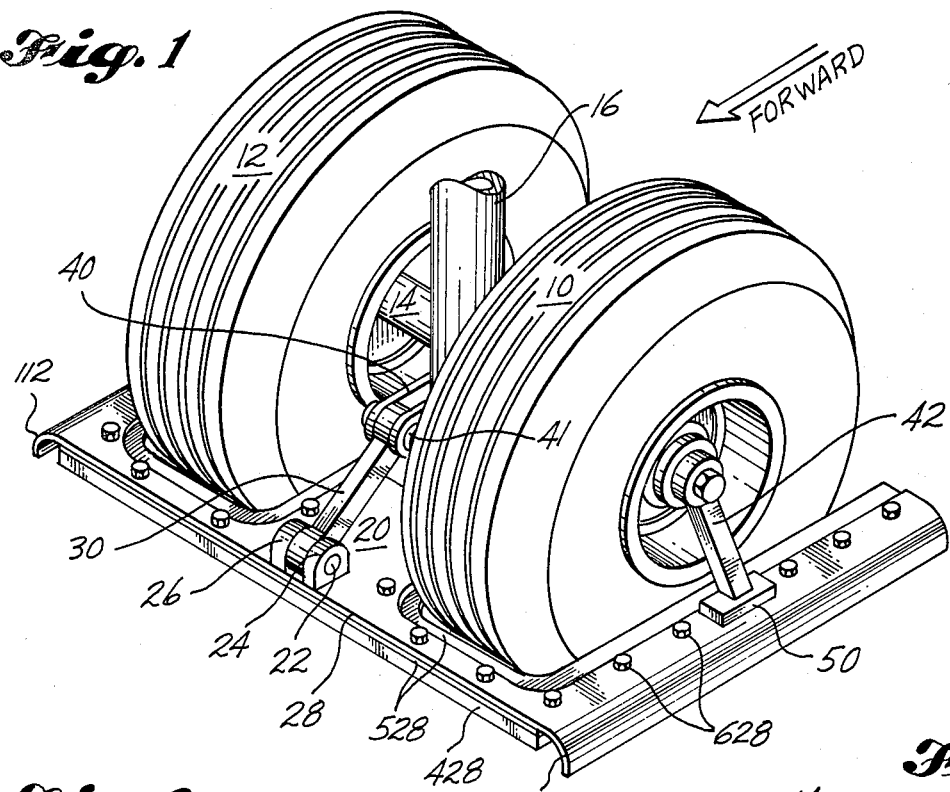
FIG. 1 is a perspective view showing the present nose wheel water spray deflector apparatus.
Figure 2:
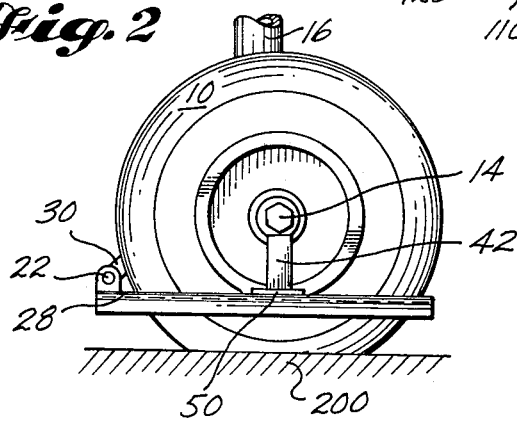
FIG. 2 is a side elevational view of the deflector apparatus of FIG. 1.

Turning now to FIG. 1, it will be seen that nose landing gear inner cylinder 16 carries supportedly fixed thereto axle 14 supporting rotatably mounted thereon in conventional manner a pair of nose gear wheels 10 and 12.

The present nose wheel water spray deflector apparatus 20 includes a lateral support tube member 22 fixed on either end thereof by a pair of flanges 24 and 26 integral with horizontal deflector plate member 28. Center support member 30 provides linkage to connect lateral support tube member 22 with nose gear tow fitting 40 via bolt connection 41. Side support members 42 and 44 (seen in FIG. 3), one fixed as by bolting at one end to each side of horizontal deflector plate member 28 at points 50 and 52 (see FIG. 3), and with the other ends thereof disposed over axle 14 stubbs.

Figure 3:
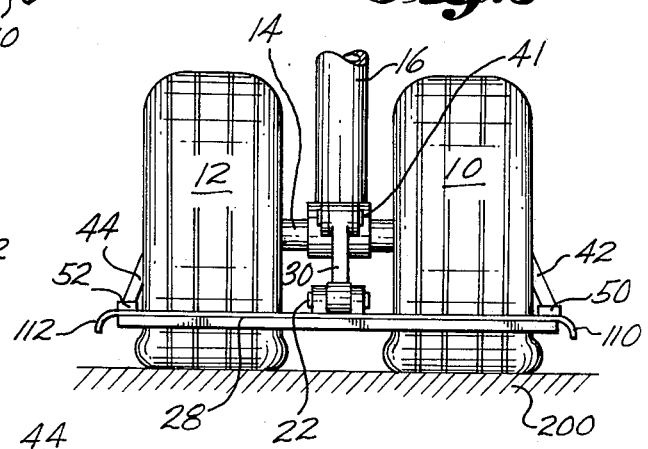
FIG. 3 is a front elevational view of the deflector apparatus of FIG. 1.

The particular structural configuration of nose wheel water spray deflector apparatus 20 and important geometrical features thereof can be further understood when it is further noted that the leading edge (as observed from the indicated forward direction denoted in FIG. 4 by numeral 128) extends beyond the outer front surfaces of nose wheels 10 and 12. It can readily be seen from FIGS. 1 and 3 that the side edge portions 112 and 110 of horizontal deflector plate member 28 are curved and directed downward toward runway surface 200 (as seen in FIG. 3). Besides noting that horizontal deflector plate member 28 extends sideways and ahead of nose wheels 10 and 12, it should be further noted that horizontal deflector plate member 28 extends (where nose landing gear is deployed in the extended condition as shown in FIG. 5 by dotted line representation) in a horizontal plane with respect to runway surface 200 and at a predetermined distance above runway surface 200, suspended with the bottom surface thereof about 9.1 inches below the center of axle 14. The inside dimension between side edge portions 112 and 110 of horizontal deflector plate member 28 is about 45.5 inches, and horizontal deflector plate member 28 has a central portion 228 (seen in FIG. 4) which extends aftwardly between nose wheels 10 and 12 a predetermined distance of about 8.0 inches measured rearwardly from leading edge 128. Side leg portions 328 of horizontal deflector plate member 28 extend aft of leading edge 128 a distance of about 32.2 inches. As seen in FIG. 1, a flexible pad support member 428 is utilized below horizontal deflector plate member 28 to sandwich reinforced flexible pad member 528 therebetween in a secured condition as by fasteners 628.

Figure 4:
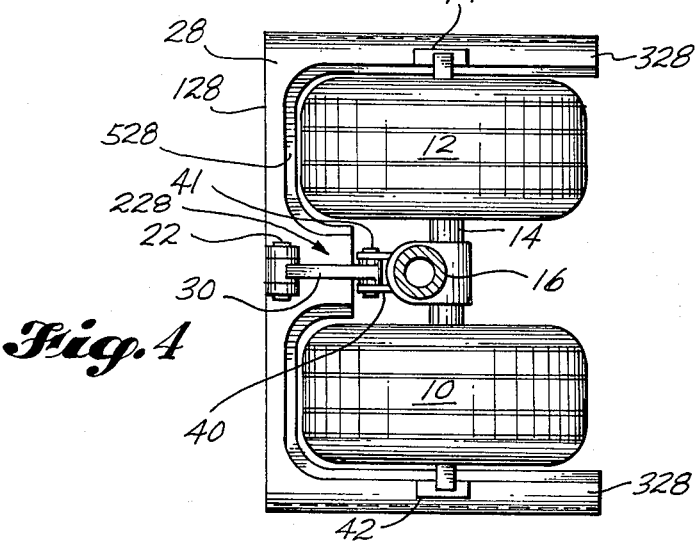
FIG. 4 is a top view of the deflector apparatus of FIG. 1 looking down from the aircraft fuselage with nose landing gear inner cylinder support for the nose wheel pair sectioned; and, FIG. 5 is a side elevational view of the nose wheel water spray deflector apparatus of FIG. 1 showing the nose gear in solid line in stowed position and in dashed line for deployed position operation.
Figure 5:
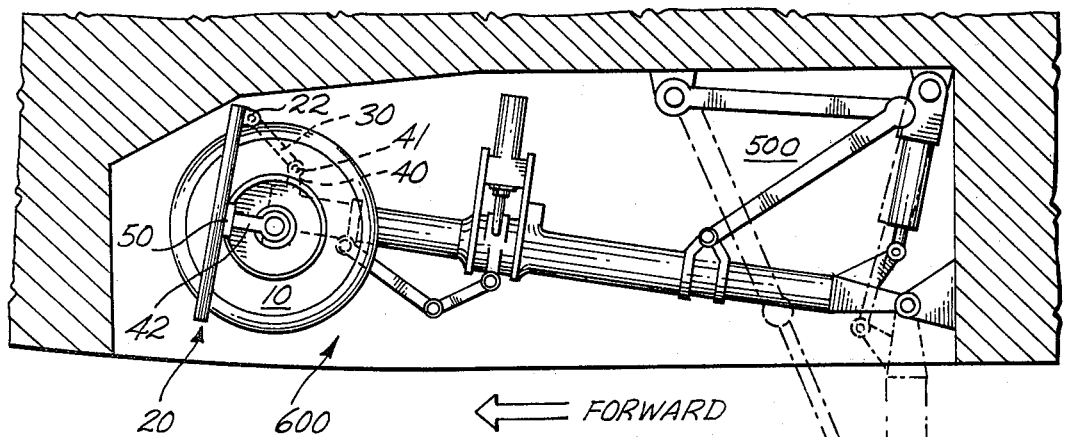
Figure 5:
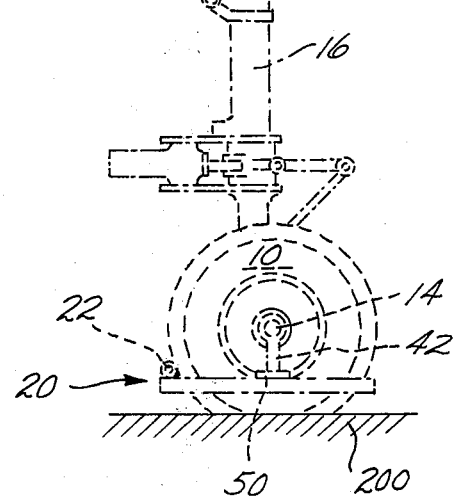

As seen from a top view in FIG. 4, flexible pad member 528 extends in a horizontal plane around the periphery of horizontal deflector plate member 28 along at least the front and sidewall surface portions of nose wheels 10 and 12 thereby reducing and minimizing the gap between horizontal deflector plate member 28 and the front and sidewall surface portions of nose wheels 10 and 12, the flexibility accommodating deflections and changes in shape and size of tires caused by use. The distance dimension of horizontal deflector plate member 28 from wheel centers provides sufficient ground clearance of member 28 in the event of a flat tire on the nose gear. FIG. 5 is deemed helpful in showing how the present nose wheel water spray deflector apparatus 20 as hereinbefore described can be extended for deployment (as in the dotted line representation) or retracted by conventional nose wheel landing gear apparatus 500 into nose gear wheel well 600.

We claim:

1. In combination in an aircraft having a plurality of wing mounted engines and a nose landing gear having a pair of nose wheels, a nose wheel water spray deflector for preventing nose landing gear wheel generated side spray ingestion by said wing mounted engine, said nose wheel water spray deflector having a leading edge extending forward of siad pair of nose wheels, extending across the front of said nose wheels, and further extending in a plane parallel to the runway surface when the aircraft is in a landing configuration with nose wheels on the runway surface, said nose wheel water spray deflector attached to the inner cylinder of said nose landing gear and retractable through the nose wheel doorway during flight of the aircraft, said nose wheel water spray deflector having a lateral support tube connected through a center support member to the tow fitting of said nose gear.

2. A nose wheel water spray deflector for aircraft having a plurality of wing mounted engines and a nose landing gear including a pair of nose wheels, comprising in combination:

a. a nose wheel water spray deflector for preventing side spray of water generated by nose wheels to be ingested in said engines, said deflector mounted in a plane parallel to the runway surface, in the aircraft landing position, and extending forward, left and right side, and partly rearward of said wheels;

b. said deflector mounted by a lateral support member connected between said deflector forward center portion and said landing gear strut and by side support members between each deflector plate right and left side and said wheel associated axle stubs respectively; and, c. wherein said deflector plate is characterized by having downward curved right and left sides for deflecting said water spray; and, d. wherein said deflector plate is retractable through said associated nose wheel doorway into said aircraft nose section; and, e. characterized by a mounted flexible pad being mounted onto said deflector plate bottom and extending past said deflector plate in the direction of said wheels or tires to form a most possible close but controlled gap therebetween, accommodating tire flexibility.

* * * * *